United States Patent [19]

DePaolo

[11] 4,201,803

[45] May 6, 1980

[54] METHOD FOR SIZING AND COLORING TEXTILE MATERIALS

[75] Inventor: George R. DePaolo, Readington Township, Hunterdon County, N.J.

[73] Assignee: American Cyanamid Company, Stamford, Conn.

[21] Appl. No.: 877,138

[22] Filed: Feb. 13, 1978

[51] Int. Cl.² .............................................. B05D 3/02
[52] U.S. Cl. ............................ 427/381; 260/29.2 TN; 260/29.4 R; 260/37 N; 260/37 NP; 260/39 R; 260/39 P; 427/389.9; 427/382; 525/480
[58] Field of Search .................... 427/382, 381, 390 R; 260/37 N, 37 NP, 39 R, 39 P, 849, 29.2 TN, 29.4 R

[56] References Cited

U.S. PATENT DOCUMENTS

| | | | |
|---|---|---|---|
| 3,709,860 | 11/1973 | Fischer et al. | 260/29.2 X |
| 3,828,005 | 8/1974 | Pittman et al. | 260/29.2 X |
| 3,867,171 | 2/1975 | Ellsworth | 260/29.2 X |
| 4,046,729 | 9/1977 | Scriven et al. | 260/29.2 TN |
| 4,048,001 | 9/1977 | Remley | 260/29.2 X |
| 4,061,618 | 12/1977 | Stanley et al. | 260/29.2 TN |

*Primary Examiner*—Michael R. Lusignan
*Attorney, Agent, or Firm*—H. G. Jackson

[57] ABSTRACT

Durable sizing of a textile substrate may be accomplished by applying thereto an aqueous dispersion or emulsion of an unthickened chain extended polyurethane having pendant carboxyl groups, a tertiary amine, a thermosetting aminoplast resin, a catalyst for curing said resin, and an anionic or nonionic surfactant.

19 Claims, No Drawings

METHOD FOR SIZING AND COLORING TEXTILE MATERIALS

This invention relates to a method for durably sizing and optionally coloring, textile filaments, yarns, and fabrics. More particularly, the present invention relates to a method for durably sizing and optionally coloring, polyester warp yarns.

The sizing of textile yarns prior to weaving is conventional in the art. Materials such as starches, polyvinyl alcohol, polyacrylates, polyacrylamides and polyesters are used as nondurable sizes for textile yarns, such as nylon and polyester warp yarns, prior to the weaving operation to protect the yarn from abrasion. Durable sizes are also used conventionally to protect the yarn during the weaving operation and to provide a permanent firm handle to the woven fabric and/or to bind a pigment or dye on the sized yarn which is durably fixed and therefore is not removed during subsequent washing or dry cleaning. The products of the present invention are particularly suited for the durable size application, possessing excellent compatibility with most additives, including pigment dispersions, and demonstrating outstanding durability to laundering and dry cleaning.

U.S. Pat. No. 3,640,924 discloses the use of a thickened polyurethane emulsion, optionally with a thermosetting aminoplast resin, as a textile adhesive. The composition used has a viscosity in the range of 20,000 to 100,000 cps.

U.S. Pat. No. 3,867,171 discloses a process for coloring textile substrates of synthetic fibers by applying thereto a dispersion of a self-dispersible or emulsifiable polyurethane, a pigment, an aminoplast resin and a catalyst for said aminoplast resin, and drying the treated substrate. The specification teaches that viscosities of 900–150,000 cps. are needed to prevent penetration of the adhesive into the substrate, and the material is applied by coating the substrate.

The subject invention is distinguished from the above patents in that an unthickened dispersion is used as a durable sizing agent, and/or colorant binder, and is applied by submersing the yarn into the dispersion, as opposed to coating the dispersion on the yarn.

U.S. Pat. Nos. 3,061,470 and 3,086,887 relate to methods for sizing textile yarns using a water-soluble polyethyleneoxy polyurethane. The present invention is distinguished from these patents in that the chain-extended polyurethane used therein is not water-soluble and in the composition of the polyurethane used.

The method of the present invention is distinguished from U.S. Pat. No. 2,863,788 by the fact that improved durability is obtained by inclusion of the chain-extended polyurethane.

In accordance with the present invention, there is provided a method for durably sizing and optionally coloring, textile filaments, yarns, or fabrics made from natural fibers, synthetic fibers, or blends thereof, comprising applying thereto a fluid aqueous dispersion of a chain-extended polyurethane polymer having pendant carboxyl groups, a tertiary amine, a thermosetting aminoplast resin, a catalyst for curing said aminoplast resin, an anionic or non-ionic surfactant, and, optionally, a water-immiscible colorant, drying, and curing the treated material at an elevated temperature.

In a preferred method, an antioxidant and/or an ultraviolet absorber are included in said aqueous dispersion.

In an especially preferred method, the thermosetting aminoplast resin is a methylated trimethylolmelamine formaldehyde resin having at least two methoxymethyl groups per molecule.

The polyurethane compositions used in the method of this invention are fluid aqueous dispersions of chain-extended polyurethanes having pendant carboxyl groups such as are disclosed in U.S. Pat. Nos. 3,640,924 and 3,835,081, incorporated herein by reference, except that in the present invention no thickening agent is added either before of after the chain-extension of the prepolymer. Preferably, the chain-extension is carried out in water in the presence of a tertiary amine and a di-secondary diamine. More preferably, the chain extension is carried out in water in the presence of triethylamine and about 10–20 parts by weight of piperazine hexahydrate per part by weight of polyurethane prepolymer.

Other materials may be used in the reaction mixture during the preparation of the prepolymer, or after the chain-extension thereof. For example, it may be preferable to utilize an antioxidant, and/or an ultraviolet absorber, in the preparation of the prepolymer, or to add an anionic or nonionic surfactant after the chain-extension is completed.

Antioxidants and ultraviolet absorbers which may be used in the preparation of the prepolymer are disclosed by U.S. Pat. No. 3,488,290 which is incorporated herein by reference. Presently, the preferred antioxidant is 2,2'-methylene-bis(4-methyl-6-t-butylphenol), and the preferred ultra-violet absorber is 5-chloro-2-(3,5-di-t-butyl-2-hydroxyphenyl)benzotriazole.

Anionic surfactants which may be added to the aqueous dispersion of the chain-extended polyurethane include the following: sodium bis(2-ethylhexyl)sulfosuccinate, sodium lauryl sulfate, sodium isopropylnaphthalene sulfonate, sodium bis(tridecyl)sulfosuccinate, N-octadecyl disodium sulfosuccinate, and the like.

Nonionic surfactants which may be added to the aqueous dispersion of the chain-extended polyurethane include the following: octylphenoxypoly(ethyleneoxy)ethanol, trimethylnonyloxypoly(ethyleneoxy)ethanol, nonylphenoxypoly(ethyleneoxy)ethanol, glyceryl trioleate, ethyleneglycol ethyleneglycol ethyleneglycol monostearate, sorbitan trioleate, sorbitan tristearate, and the like.

Nonionic and anionic penetrating agents and antifoaming agents commonly used by those skilled in the art of sizing and coloring may also be employed. Suitable penetrating agents which may be used include the following: diethanolamine, N-aminoethyl ethanolamine, butyl carbitol, butyl cellosolve, diethylene glycol, diethylene glycol monobutyl ether, dipropylene glycol monomethyl ether, ethylene glycol, dihexyl sodium sulfosuccinate, and the like. Suitable antifoaming agents which may be used include the following: isobutanol, n-butanol, iso-decanol, dibutyl phthalate, diethylene glycol laurate, 2-ethylhexanol, n-octanol, polypropylene glycol, tributyl citrate, and the like.

The final reaction mixture contains about 25–40% by weight of the chain-extended polyurethane, and about 0.5–3.0% by weight of said tertiary amine, with the balance being water. Optionally, the reaction mixture may contain about 0–0.5% by weight of an antioxidant, about 0–0.5% by weight of an ultra-violet absorber, and about 0–6.0% by weight of a surfactant. The final reaction mixture contains about 25–45% by weight of total solids.

A sizing, or colorant-binding, composition is formed by mixing components to obtain a fluid dispersion comprising: about 3–15%, preferably 4–7%, by weight real solids from the above-described polyurethane reaction mixture; about 0–12%, preferably 0–8%, by weight of a water-immiscible colorant; about 0.6–6%, preferably 1–4%, by weight of a thermosetting aminoplast resin; about 0.06–0.6%, preferably 0.1–0.4%, by weight of a catalyst for curing said aminoplast resin; about 0–3.0%, preferably about 1.5–2%, by weight of a surfactant; about 0–3.0%, preferably 0.5–1.5%, by weight of an antifoaming agent; and about 0–3.0%, preferably 1.5–2.0%, of a penetrating agent, with the balance being water.

If a colorant is used, it is preferably admixed simultaneously with the polyurethane reaction mixture. The use of a surfactant is particularly important if the concentration of the colorant exceeds 10% by weight in order to prevent an excessive increase in viscosity. The pH of the final sizing, or colorant-binding, compositon, is about 6.9–7.1.

Optionally, the surfactant may be added directly to the sizing, or colorant-binding, composition instead of the polyurethane reaction mixture to obtain the above-mentioned concentrations.

Thermosetting aminoplasts which may be used in the process of this invention are melamine-formaldehyde, guanamine-formaldehyde, urea-, thiourea-, cyclicurea- or cyclic thiourea-formaldehyde, precondensates, and the like. The preferred aminoplast precondensates are $C_1$–$C_{10}$ alkylated melamine-formaldehyde resins. More preferably, the aminoplast is a trimethylol melamine-formaldehyde containing at least two methoxymethyl groups per molecule of aminoplast compound. Mixtures of the aforementioned aminoplasts may also be used.

The curing catalysts for the aminoplast which may be used include amine or ammonium salts such as ammonium chloride, ammonium nitrate, ammonium sulfate, ammonium acid phosphate, isopropanolamine hydrochloride, and the like. Generally, any such catalyst may be used with about equal results.

Suitable water-immiscible colorants which may be used include the following wherein C.I. means Colour Index (published by The Society of Dyers and Colourists): C.I. Direct Blue 86, C.I. Pigment Yellow 14, C.I. Pigment Blue 15, C.I. Pigment Black 7, C.I. Pigment Green 1, C.I. Pigment Orange 5, C.I. Pigment Red 12, and the like. The preferred colorant is C.I. Pigment Blue 15.

The application of the sizing, or colorant-binding, composition to the textile material is by conventional padding, spraying, knife-coating, and the like, to deposit thereon about 2–10%, preferably 3–5%, by weight real solids from the aforedescribed polyurethane reaction mixture; about 0.4–4%, preferably 1–3%, by weight of the thermosetting aminoplast resin; about 0.04–0.4%, preferably 0.1–0.3%, by weight of the curing catalyst for the aminoplast resin; and about 0–9%, preferably 0–6%, by weight of the water-immiscible colorant, based on the weight of the textile material. Suitable textile materials include filaments, yarns, or fabrics of natural or synthetic fibers, or blends thereof. The preferred substrate material is a polyester warp yarn.

The treated textile substrate is then dried and cured by heating at 100°–350° F. for a period of about 5 seconds to 5 minutes, preferably at 225°–300° F. for a period of about 20 seconds to 2 minutes. Optionally, the treated substrate may be dried at a lower temperature, such as by standing at room temperature until dry, and then cured at 225°–300° F. for a period of about 30 seconds to 2 minutes, preferably at 225°–300° F. for a period of about 1–2 minutes.

The process of this invention produces an insoluble size or colorant-binding coating on the textile substrate which is durable to laundering and dry cleaning. The treated substrate has satisfactory handle and is tack-free. The treated polyester warp yarn is characterized by excellent weaving characteristics.

The following examples illustrate the process of this invention. All parts and percentages are by weight unless otherwise indicated. All washes are carried out in an automatic washer, using warm water containing an anionic, built, low-sudsing detergent, and a regular wash cycle.

EXAMPLE 1

Preparation of Polyurethane Size Composition (a) Preparation of Prepolymer

Polypropylene glycol (1898 parts; NIAX$^R$ Polyol PPG2025, Union Carbide Corp.) is charged to a suitable reaction vessel, heated to 130° C. under a blanket for nitrogen and 61.7 parts of 2,2'-bis(hydroxymethyl)propionic acid (DMPA), 2,2'-methylenebis(4-methyl-6-t-butyl)phenol (7.1 parts), and 2,4-di-tert-butyl-6-(5-chloro-2H-benzotriazol-2-yl)phenol (14.5 parts) are added thereto. After dissolution is complete, the reaction mixture is cooled to 55° C. over a period of about 30 minutes and tolylene diisocyanate (500 parts of Hylene$^R$TM (duPont), a 80/20 mixture of the 2,4 and 2,6 isomers, respectively) is slowly added thereto while maintaining the nitrogen atmosphere. The reaction exotherm is allowed to raise the temperature to 90° C. at which point the reaction mixture is cooled to 70° C. and maintained at 70° C. for 6 hours.

(b) Emulsification of Prepolymer

Emulsification and chain-extension are carried out by mixing under high speed agitation the prepolymer solution from (a) and a mixture of water (2000 parts), ice flakes (1825 parts), triethylamine (47.7 parts) and piperazine hexahydrate (134 parts). The resulting emulsion is then stirred at ambient temperature until carbon dioxide no longer evolves. A nonionic surfactant (Deceresol$^R$NI Conc.; American Cyanamid Company), a 100% real ethylene oxide adduct of nonylphenol, is added thereto using 6 parts of surfactant per 100 parts of emulsion. The mixture is then diluted with water to about 40% total solids. The final product has the following approximate composition:

|  | % |
|---|---|
| chain-extended polyurethane resin | 32.0 |
| nonionic surfactant | 5.1 |
| 2,2'-methylenebis(4-methyl-6-t-butylphenol) | 0.1 |
| 5-chloro-2-(2-hydroxy-3,5-di-t-butylphenyl)-benzotriazole | 0.2 |
| triethylamine | 0.6 |
| piperazine hydrate | 1.7 |
| water | 60.3 |
|  | 100.0 |

EXAMPLE 2

Application of Product of Example 1

An application bath is prepared having the following composition:

|  | Parts |
|---|---|
| Emulsion of Example 1 | 30 |
| Aerotex®Resin M-3[a] | 5 |
| Catalyst A[b] | 4 |
| Penetrant 8928[c] | 2 |
| Antifoam 8929[d] | 1 |
| Water to make a total of | 100 parts |

(a) A partially methylated melamine formaldehyde thermosetting resin containing about 80% real solids.

(b) A 10% aqueous solution of mixed isopropanolamine hydrochlorides.

(c) Sherwin-Williams Company, Greensboro, N.C.

(d) Sherwin-Williams Company, Greensboro, N.C.

Polyester warp yarn is passed through the application solution to obtain a 70% wet pickup and deposit about 10% solids thereon. The warp yarn is then dried and cured at 250° F. for 2 minutes. The resulting sized warp yarn has a firm hand.

In the manner described above, substituting 1 part of ammonium chloride, ammonium nitrate, ammonium sulfate, or ammonium acid phosphate for Catalyst A, similar results are obtained.

EXAMPLE 3

Alternate Preparation of Polyurethane Size Composition (a) Preparation of Prepolymer Polypropylene glycol (1898 parts; NIAX®Polyol PPG2025) is charged to a suitable reaction vessel together with finely ground DMPA (61.7 parts) and the reaction mixture is heated under nitrogen to 110° C. for a period of 2 hours. The reaction mixture is then cooled to 65° C. and tolylene diisocyanate (500 parts) is gradually added thereto while maintaining the nitrogen atmosphere. The reaction mixture is then allowed to rise to 90° C., cooled to 70° C. and maintained at 70° C. for a period of 18 hours.

(b) Emulsification of Prepolymer

Emulsification and chain-extension are carried out as in Example 1 utilizing the prepolymer solution from (a) above except that the Deceresol®NI Conc. is not added at this point. The emulsified product contains 40% total solids, and has a viscosity of 8.5 centipoises as measured on a Brookfield Viscometer L.V.F. at 26° C. using spindle No. 1.

The above-described preparation is distinguished from the preparation of Example 1 in that no antioxidant or ultraviolet absorber is used in the preparation of the prepolymer and in the fact that the nonionic surfactant is not added directly to the emulsified prepolymer.

EXAMPLE 4

Application of Product of Example 3

An application bath is prepared having the following composition:

|  | Parts |
|---|---|
| Emulsion of Example 3 | 30 |
| Colorant[a] | 30 |
| Aerotex®Resin M-3 | 2.5 |
| Catalyst A | 2.5 |
| Penetrant 8928 | 2 |
| Antifoam 8929 | 1 |
| Deceresol®Surfactant NI Conc. | 2 |

|  | Parts |
|---|---|
| Water to make a total of | 100 parts |

(a) Kemslash®Blue 6417 (Sherwin-Williams Company), an aqueous dispersion of phthalocyanine blue containing about 48–52% solids.

The above-described application bath has a pH of 7.1. It remains fluid after standing at ambient temperature for 18 hours, and has a viscosity of 8.5 centipoises.

A 100% polyester fabric (Dacron®Type 54) is submerged in the application solution, passed between squeeze rolls to obtain a wet pickup of 70% based on the weight of the fabric, dried 2½ minutes at 225° F. and cured 2 minutes at 260° F.

The cured fabric has a firm hand which is durable to washing and dry cleaning.

Evaluation of the cured fabric initially, after 5 washes, and after 3 dry cleanings, with a Hunterlab Model D25 Color and Color-Difference Meter (Hunter Associates Laboratory, Fairfax, Va.), shows no change in color or color-difference (L).

The above results show that durable sizing and colorant-binding properties are imparted by the finish to the treated textile material.

EXAMPLE 5

(a) Preparation of Prepolymer

Polypropylene glycol (1275 parts; NIAX®Polyol 1025) is charged to a reactor vessel and heated to 70° C. under a nitrogen atmosphere. To the reactor are added 2,2'-bis(hydroxymethyl)propionic acid (98 parts), 2,2'-methylenebis(4-methyl-6-tert-butylphenol) (4.8 parts), and 2,4-di-tert-butyl-6-(5-chloro-2H-benzotriazol-2-yl)phenol (9.7 parts), and the reaction mixture is heated to 110° C. and maintained thereat until all materials are dissolved. The reaction mixture is then cooled to 75° C. and tolylene diisocyanate (594 parts; Hylene®TM) is added while maintaining the temperature at 70°–75° C. After the addition of the tolylene diisocyanate is completed, the reaction mixture is stirred at 70° C. for 6 hours and then placed in an oven at 60°–65° C. to hold for emulsification.

(b) Emulsification of Prepolymer

Emulsification and chain-extension are carried out by mixing triethylamine (34 parts), water (1000 parts) and ice flakes (470 parts) in a Waring blender and slowly adding the prepolymer (900 parts) from (a). When the addition is completed, the reaction mixture is stirred at ambient temperature until carbon dioxide no longer evolves. The resulting emulsion is diluted with water to 35% total solids, and has a viscosity of 8.0 centipoises.

The above-described emulsion is evaluated as a sizing agent in the following manner. A film, about 2.5 mils in thickness, is drawn on a glass plate and dried for 3 minutes at 300° F. The resulting film is tack-free and is not washed off the plate by contact with warm running water.

An 8.1 gram sample of the above emulsion is placed in an aluminum weighing tray, dried overnight at 170° F. and cured for 2 minutes at 260° F. The tray is then weighed and placed in boiling water for 30 seconds. No loss in weight is noted after drying the wet tray. The film on the tray does not show water solubility by this test and thus is useful as a sizing agent.

EXAMPLE 6

Evaluation of Product of Example 5

An application bath is prepared having the following composition:

|  | Parts |
|---|---|
| Emulsion of Example 5 (viscosity 8.0 centipoises) | 45.6 |
| Colorant[a] | 8.0 |
| Aerotex ®Resin M-3 | 5.0 |
| Penetrant 8928 | 3.0 |
| Antifoam 8929 | 1.0 |
| Ammonium Chloride | 1.0 |
| Water to make a total of | 200 parts |

(a) Kemslash[R]Blue 64M, Sherwin-Williams Company.

A 100% polyester fabric is contacted with the application bath, passed between squeeze rolls to obtain a wet pickup of 74% based on the weight of the fabric, dried 2½ minutes at 225° F. and cured for 2 minutes at 225° F.

Evaluation of the cured fabric initially, after 5 washes, and after 3 dry cleanings with a Hunterlab Model D25 Color and Color Difference Meter, shows the following results:

|  | Readings | | |
|---|---|---|---|
|  | L[a] | a | b |
| Initially | 27.3 | +6.1 | −47.0 |
| 5 Washes | 27.3 | +6.1 | −46.4 |
| 3 Dry Cleanings | 27.2 | +6.1 | −47.0 |

[a]Lightness

The above results show essentially no color difference or change in color after washing and dry cleaning.

In the manner described above, substituting 1 part of ammonium nitrate, ammonium acid phosphate, or ammonium sulfate for the ammonium chloride, similar results are obtained.

EXAMPLE 7

The procedure of Example 6 is followed except that the emulsion from Example 5 is not included and the colorant is Kemslash[R]Blue 6417 (Sherwin-Williams Company).

A 100% polyester fabric is contacted with the application bath to obtain a wet pickup of 70% on the weight of the fabric, dried 2 minutes at 225° F. and cured for 2 minutes at 260° F.

Evaluation of the cured fabric initially and after 1 wash shows the following color values:

|  | L |
|---|---|
| Initially | 33.2 |
| After 1 wash | 37.8 |

The above results show that exclusion of the sizing agent results in a significant color difference ($\Delta L = +4.6$) after only 1 wash.

EXAMPLE 8

A prepolymer is prepared in the manner of Example 1. Two portions (490 parts each) are charged to separate Waring Blenders containing the ingredients listed under A and B, below.

|  | Parts | |
|---|---|---|
|  | A | B |
| Water | 400 | 400 |
| Ice Flakes | 385 | 385 |
| Triethylamine | 9.5 | 9.5 |
| Piperazine . 6H$_2$O | — | 27.0 |

Two dispersions are prepared each containing Kemslash[R]Blue 6417 (30 parts), and water (40 parts). One dispersion contains additionally the emulsion of A (30 parts) and the other contains additionally the emulsion of B (30 parts).

After allowing the dispersions to stand at ambient temperatures for 6 hours, dispersion A is slightly thickened. After 18 hours at room temperature, dispersion B is still fluid.

This example illustrates that the combination of triethylamine and piperazine hexahydrate improves the fluidity of dispersions containing a high concentration of colorant and high concentration of sizing agent.

EXAMPLE 9

An application bath is prepared having the following composition:

|  | Parts |
|---|---|
| Emulsion of Example 8A | 34.3 |
| Colorant[a] | 50.0 |
| Anionic Penetrating Agent[b] | 4.0 |
| Water to make a total of | 200 parts |

(a) A 64% dispersion of Direct Blue 86 (C.I. 74180).
(b) A 5% solution of the dihexyl ester of sodium sulfosuccinic acid.

A 100% polyester fabric is contacted with the above composition to obtain a wet pickup of 70%, on the weight of the fabric, dried 2 minutes at 225° F. and cured 2 minutes at 260° F.

Evaluation of the cured fabric initially and after 1 wash shows a color difference ($\Delta L$) of 26.3. This result illustrates the criticality of the presence of the thermosetting resin and catalyst.

EXAMPLES 10–15

Six application baths are prepared each containing the materials listed in Example 9, and the additional materials as listed below. Sufficient water is then added to each dispersion to make a total of 200 parts.

|  | Parts | |
|---|---|---|
| Example | Aerotex Resin M-3 | Ammonium Chloride |
| 10 | 2.5 | — |
| 11 | 2.5 | 0.63 |
| 12 | 5.0 | — |
| 13 | 5.0 | 1.25 |
| 14 | 10.0 | — |
| 15 | 10.0 | 2.5 |

Polyester fabrics (100%) are passed through each of the baths and between squeeze rolls to obtain 69–72% wet pickups based on the weight of the fabric. The treated fabrics are then dried 2 minutes at 225° F., cured 2 minutes at 260° F., and evaluated for color change after 1 wash. The results in terms of color difference ($\Delta L$) are listed below.

| | Example | | | | | |
|---|---|---|---|---|---|---|
| | 10 | 11 | 12 | 13 | 14 | 15 |
| ΔL | 9.9 | 1.5 | 9.9 | 2.1 | 13.3 | 2.2 |

The above results show that a catalyst is critical in order to obtain lower ΔL values.

EXAMPLES 16–27

The procedures of Examples 10–15 are followed except that 45.7 parts of the product of Example 8A are used in each pad bath. The color differences obtained are shown below.

| | 16 | 17 | 18 | 19 | 20 | 21 |
|---|---|---|---|---|---|---|
| ΔL | 8.1 | 3.1 | 3.7 | 0.3 | 8.0 | 1.7 |

The procedures of Examples 10–15 are followed except that 57.2 parts of the product of Example 8A are used in each pad bath. The color differences obtained are shown below.

| | 22 | 23 | 24 | 25 | 26 | 27 |
|---|---|---|---|---|---|---|
| ΔL | 6.1 | 2.3 | 3.3 | 0 | 4.1 | 0.7 |

Comparison of the results of Examples 16–27 shows that resistance to color difference is improved by increasing the concentration of the sizing agent and including a catalyst.

What is claimed is:

1. A method for durably sizing a textile substrate material by applying thereto an aqueous dispersion or emulsion of a chain-extended polyurethane having pendant carboxyl groups, a tertiary amine, a thermosetting aminoplast resin, a catalyst for curing said aminoplast resin, and an anionic or nonionic surfactant, drying, and curing the treated material at an elevated temperature.

2. The method according to claim 1 wherein said aqueous dispersion further contains a water-immiscible colorant dispersed therein.

3. The method according to claim 2 wherein said aqueous dispersion further contains an ultraviolet light absorber.

4. The method according to claim 1 wherein said aqueous dispersion further contains an antioxidant and an ultraviolet light absorber.

5. The method according to claim 1 wherein the textile material is a polyester or a polyester-cotton blend, and the aminoplast resin a methylated trimethylol melamine formaldehyde resin having at least two methoxymethyl groups.

6. The method according to claim 2 wherein the textile material is a polyester or a polyester-cotton blend, and the aminoplast resin a methylated trimethylol melamine formaldehyde resin having at least two methoxymethyl groups.

7. The method according to claim 3 wherein the textile material is a polyester or a polyester-cotton blend, and the aminoplast resin a methylated trimethylol melamine formaldehyde resin having at least two methoxymethyl groups.

8. The method according to claim 4 wherein the textile material is a polyester or a polyester-cotton blend, and the aminoplast resin a methylated trimethylol melamine formaldehyde resin having at least two methoxymethyl groups.

9. The method according to claim 1 wherein about 3–8% by weight of said polyurethane, about 0.5–5% by weight of said aminoplast resin and about 0.05–1% by weight of said catalyst, based on the weight of the textile material, are deposited thereon and the treated material is dried at 100°–350° F. for about 5 seconds to about 5 minutes and cured at about 200°–350° F. for about 1–4 minutes.

10. The method according to claim 9 wherein about 4–7% by weight of said polyurethane, about 1–3% by weight of said aminoplast resin and about 0.1–0.3% by weight of said catalyst, based on the weight of said textile material, are deposited thereon and the treated material is dried at about 225°–350° F. for about 20 seconds to about 2 minutes and cured at about 225°–300° F. for about 1–2 minutes.

11. The method according to claim 3 wherein said antioxidant is 2,2'-methylene-bis(4-methyl-6-t-butylphenol) and said ultraviolte light absorber is 5-chloro-2-(3,5-di-t-butyl-2-hydroxyphenyl)-benzotriazole.

12. The method according to claim 2 wherein said water-immiscible colorant is an organic pigment.

13. The method according to claim 2 wherein about 0.1–9% by weight of a water-immiscible colorant, based on the weight of said textile material, is deposited thereon.

14. The method according to claim 13 wherein about 1–6% by weight of said water-immiscible colorant, based on the weight of said textile material, is deposited thereon.

15. The method according to claim 14 wherein said water-immiscible colorant is an organic pigment.

16. The method according to claim 1 wherein the aqueous dispersion or emulsion has a viscosity below about 700 centipoises.

17. The method according to claim 1 wherein the aqueous dispersion or emulsion has a viscosity below about 500 centipoises.

18. The method according to claim 1 wherein the aqueous dispersion or emulsion has a viscosity below about 260 centipoises.

19. The method according to claim 1 wherein the aqueous dispersion or emulsion has a viscosity below about 50 centipoises.

* * * * *